(12) United States Patent
Norris

(10) Patent No.: US 6,350,960 B1
(45) Date of Patent: Feb. 26, 2002

(54) PARTS-IN-PLACE SAFETY RESET CIRCUIT AND METHOD FOR CONTACT START PLASMA-ARC TORCH

(75) Inventor: Steve Norris, New London, NH (US)

(73) Assignee: Thermal Dynamics Corporation, West Lebanon, NH (US)

(*) Notice: Subject to any disclaimer, the term of this patent is extended or adjusted under 35 U.S.C. 154(b) by 0 days.

(21) Appl. No.: 09/724,984

(22) Filed: Nov. 28, 2000

(51) Int. Cl.[7] .................................................. B23K 9/00
(52) U.S. Cl. ............................ 219/121.54; 219/121.57; 219/121.5
(58) Field of Search ....................... 219/121.36, 121.54, 219/121.5, 75, 74

(56) References Cited

U.S. PATENT DOCUMENTS

| | | |
|---|---|---|
| 3,745,321 A | 7/1973 | Shapiro et al. |
| 4,225,769 A | 9/1980 | Wilkins |
| 4,272,671 A | 6/1981 | Hukagawa |
| 4,330,700 A | 5/1982 | Jagieniak |
| 4,585,921 A | 4/1986 | Wilkins et al. |
| 4,692,582 A | 9/1987 | Marhic |
| 4,814,577 A | 3/1989 | Dallavalle et al. |
| 4,929,811 A | 5/1990 | Blankenship |
| 4,973,816 A * | 11/1990 | Haberman ............. 219/121.57 |
| 4,987,285 A | 1/1991 | Dallavalle et al. |
| 5,170,030 A | 12/1992 | Solley et al. |
| 5,216,221 A | 6/1993 | Carkhuff |
| 5,241,152 A | 8/1993 | Anderson et al. |
| 5,296,665 A | 3/1994 | Peterson et al. |
| 5,530,220 A | 6/1996 | Tatham |
| 5,584,972 A | 12/1996 | Lantsman |
| 5,620,617 A | 4/1997 | Borowy et al. |
| 5,630,952 A | 5/1997 | Karino et al. |
| 5,660,745 A | 8/1997 | Naor |
| 5,796,067 A | 8/1998 | Enyedy et al. |
| 5,844,197 A | 12/1998 | Daniel |
| 5,847,354 A | 12/1998 | Daniel |
| 5,938,949 A | 12/1998 | Enyedy et al. |
| 5,864,110 A | 1/1999 | Moriguchi et al. |
| 5,900,169 A | 5/1999 | Borowy et al. |
| 5,961,855 A | 10/1999 | Hewett et al. |
| 5,990,443 A | 11/1999 | Tatham et al. |
| 6,054,670 A | 4/2000 | Naor |

\* cited by examiner

Primary Examiner—Mark Paschall
(74) Attorney, Agent, or Firm—Senniger, Powers, Leavitt & Roedel (57) ABSTRACT

A contact plasma-arc torch having a parts-in-place safety reset circuit and method. The torch includes an electrode and a tip. A safety reset circuit monitors parameters associated with the electrical relationship between the electrode and the tip to determine whether the tip and/or electrode are properly installed. The circuit also monitors an electrical relationship associated with the workpiece to detect when current is flowing in the workpiece when such current is not expected. The torch power supply and associated circuitry includes a soft start capability whereby the full power output of the power supply is supplied to the electrode over time due to the soft start characteristic of a soft start circuit. If the safety reset circuit detects that the tip and/or electrode are not properly installed, or that current is flowing in the workpiece when such current is not expected, the safety reset circuit resets the soft start circuit. When the soft start circuit is reset, the power applied to the electrode is returned to its initial starting value at or near zero volts. Thus, full power output is not applied to the electrode when the tip and/or electrode are not properly installed.

18 Claims, 5 Drawing Sheets

PARTS-IN-PLACE SAFETY RESET CIRCUIT AND METHOD FOR CONTACT START PLASMA-ARC TORCH

BACKGROUND OF THE INVENTION

This invention relates generally to improvements in plasma-arc torches and, particularly, to a circuit and method for ensuring that the parts of a contact start plasma-arc torch are properly in place before allowing the output voltage to ramp up to its final value.

Plasma-arc torches, also known as electric arc torches, are commonly used for cutting, welding, and spray bonding. Such torches typically operate by directing a plasma consisting of ionized gas particles toward a workpiece. In general, a pressurized gas to be ionized is supplied to the front end of the torch and flows past an electrode before exiting through an orifice in the torch tip. The electrode has a relatively negative potential and operates as a cathode. The torch tip, which is adjacent to the end of the electrode at the front end of the torch, constitutes a relatively positive potential anode. When a sufficiently high voltage is applied to the electrode, an arc is established across the gap between the electrode and the torch tip, thereby heating the gas and causing it to ionize. The ionized gas in the gap is blown out of the torch and appears as a flame extending externally from the tip. As the torch head or front end is brought toward the workpiece, the arc transfers between the electrode and the workpiece because the impedance of the workpiece to negative is typically lower than the impedance of the torch tip to negative. During this "transferred arc" operation, the workpiece serves as the anode.

Plasma-arc torches may be found in both "non-contact start" and "contact start" varieties. In non-contact start torches, the tip and electrode are normally maintained at a fixed physical separation in the torch head. Typically, a high voltage high frequency signal is applied to the electrode (relative to the tip) to establish a pilot arc between the electrode and the tip. As mentioned above, when the torch head is moved toward the workpiece, the arc transfers to the workpiece. By way of contrast, in contact start torches, the tip and/or electrode make electrical contact with each other (e.g., along a longitudinal axis of the electrode). For example, a spring or other mechanical means biases the tip and/or electrode such that the tip and electrode are in electrical contact. When the operator squeezes the torch trigger, a voltage is applied to the electrode and pressurized gas flows. The gas causes the tip and electrode to overcome the bias and physically separate. As the tip and electrode separate, a pilot arc is established therebetween.

The electrode and torch tip are consumable items that eventually need replacement. As such, the torch head allows for removal and replacement of both the tip and the electrode. It is normally undesirable, however, to operate a plasma-arc torch when either the tip or electrode is not properly installed. Therefore, plasma-arc torches can benefit from detection circuits that determine whether the tip and/or electrode are properly installed. In non-contact start torches these detection circuits may include a circuit for sensing tip installation, electrode installation, and that the tip and electrode are not in electrical contact. Such a parts-in-place system used for non-contact start torches may not work for contact start torches because in a contact start torch, electrical contact between the tip and electrode is necessary during pilot arc initiation.

Moreover, conventional plasma torch parts-in-place detection systems typically use additional electrical or mechanical means within the torch head or torch leads, such as contact pins, microswitches and the like. This, of course, increases the cost and complicates the design and manufacture of the torch and lead assembly.

Further, conventional plasma torches require a relatively high open circuit voltage (e.g., −300 VDC) at the electrode in order to ionize the flowing gas. If the tip were not installed, the electrode would be exposed. An exposed electrode with such a high voltage potential presents an undesirable condition.

One solution to the presence of a relatively high open circuit voltage during the parts-in-place check is described in commonly owned U.S. Pat. No. 5,961,855, the entire disclosure of which is incorporated herein by reference. The solution described therein relies on the use of a relatively low voltage source for conducting the parts-in-place check. Upon satisfactory completion of the check, the power supply transitions to a higher voltage source for normal operations. Such a system, however, requires switching between two voltage outputs.

There is a need, therefore, for a parts-in-place detection system for use with a contact start plasma-arc torch that requires no additional electrical or mechanical means or wiring within the torch head or torch leads. There is a further need to accomplish the parts-in-place function without the need for two separate voltage outputs, but rather uses the existing power supply output capabilities.

For these reasons, an improved system and method is desired for ensuring that the tip and/or electrode are properly installed in a contact start torch.

SUMMARY OF THE INVENTION

The invention meets the above needs and overcomes the deficiencies of the prior art by providing an improved circuit and method for determining whether the tip and electrode of a contact start plasma-arc torch are properly installed. This is accomplished by monitoring selected parameters indicative of proper tip and electrode installation. Advantageously, the tests described herein are completed before the power supply output reaches its final value, and preferably before it reaches approximately 40 VDC. Thus, the safety reset circuit and method described herein do not require an additional low-voltage power supply output to accomplish the parts-in-place test.

Briefly described, a system embodying aspects of the invention includes a plasma arc torch for use in connection with a work piece. The torch has an electrode. A tip is in electrical relationship with the electrode. A power supply has a power output. A housing supports the tip and the electrode. The housing allows electrical continuity between the tip and the electrode. A soft start circuit is in electrical combination with the power supply. The combination of the soft start circuit and the power supply provide a power signal to the electrode that transitions from an initial level to an operating level. A monitor circuit monitors the electrical relationship between the tip and the electrode. The monitor circuit provides a status signal indicative of the electrical relationship between the tip and the electrode. A reset circuit is responsive to the status signal. The reset circuit resets the soft start circuit so that the power signal returns to the initial level when the status signal indicates an unacceptable electrical relationship between the tip and the electrode.

Another embodiment of the invention is a plasma arc torch for use with a workpiece. The torch includes an electrode. A tip has an electrical relationship with the electrode. A power supply has a power output. A housing supports the tip and the electrode. The housing allows electrical continuity between the tip and the electrode. A soft start circuit is in electrical communication with the power supply. The soft start circuit supplies a power signal to the electrode via a soft start process. The soft start process transitions the power signal from an initial level to an operating level. A monitor circuit monitors the electrical relationship between the tip and the electrode. The monitor circuit provides a status signal indicative of the electrical relationship between the tip and the electrode. A reset circuit is responsive to the status signal. The reset signal resets the soft start circuit so that the power signal returns to the initial level when the status signal indicates an unacceptable electrical relationship between the tip and the electrode.

A further embodiment of the invention is a method of operating a contact start torch for use in connection with a workpiece. The contact start plasma arc torch includes an electrode; a tip having electrical relationship with the electrode; and a power supply having a power output. The method includes conditioning via a circuit the power output and providing a power signal to the electrode that transitions from an initial level to an operating level. The electrical relationship between the tip and the electrode is monitored. The conditioning circuit is reset so that the power signal returns to the initial level when the monitoring step indicates an unacceptable electrical relationship between the tip and the electrode.

Alternatively, the invention may comprise various other systems and methods.

Other objects and features will be in part apparent and in part pointed out hereinafter.

BRIEF DESCRIPTION OF THE DRAWINGS

Corresponding reference characters are intended to indicate corresponding parts throughout the drawings.

DETAILED DESCRIPTION OF PREFERRED EMBODIMENTS

Figure 1:
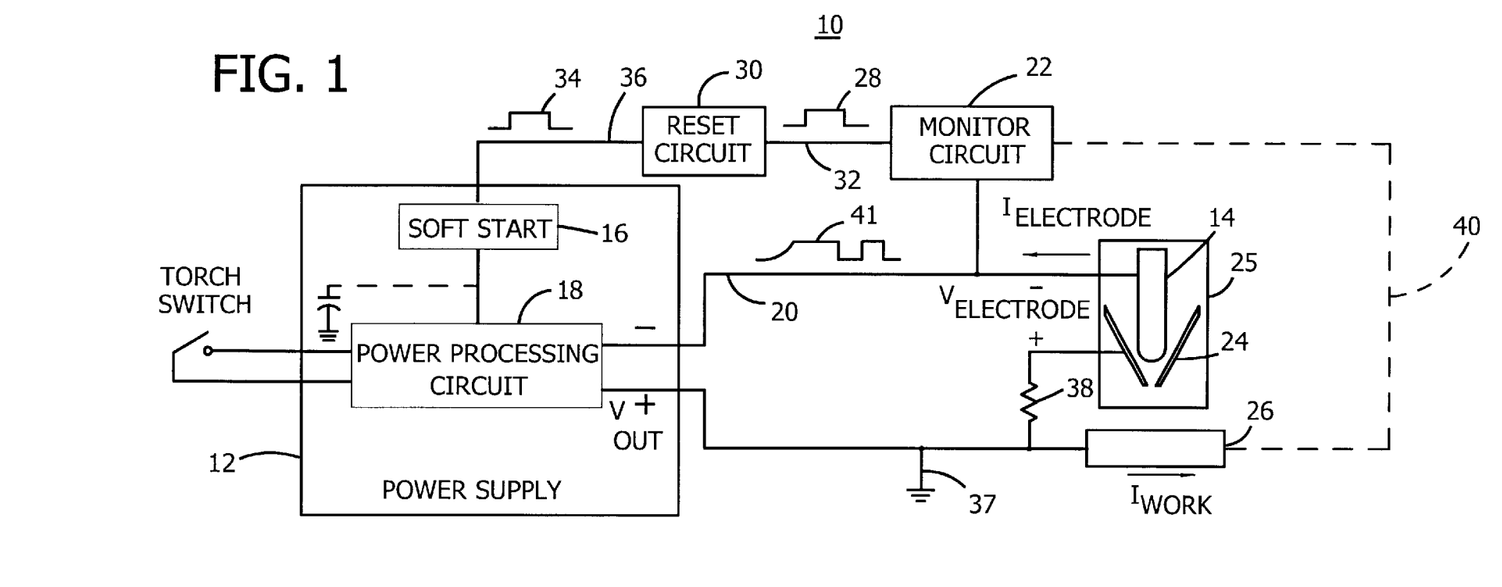
FIG. 1 is a block diagram of a contact start torch having a parts-in-place safety reset circuit in accordance with the invention.

FIG. 1 is a block diagram of a preferred embodiment of a contact start torch system 10 using a parts-in-place safety reset circuit suitable for use with the present invention. As illustrated therein, a power supply 12 has a power output. The power supply 12 provides DC power $V_{out}$ to a torch electrode 14 and has a soft start circuit 16, a power processing circuit 18, and a power line 20. A monitor circuit 22 monitors an electrical relationship between the electrode 14 and a torch tip 24. In particular, the monitor circuit 22 monitors a voltage $V_{electrode}$ applied to electrode 14 relative to the torch tip 24, and a current $I_{electrode}$ flowing to torch electrode 14 via the power line 20. Preferably, monitor circuit 22 also monitors a work current $I_{work}$ that may be flowing through a workpiece 26.

The monitor circuit 22 generates a status signal 28 that has a parameter indicative of the electrical relationship between electrode 14 and tip 24. Preferably, and as explained in greater detail below, the status signal 28 also includes a parameter indicative of the electrical relationship between electrode 14 and workpiece 26. Monitor circuit 22 provides status signal 28 to a reset circuit 30 via a line 32. The reset circuit 30 provides a reset signal 34 to the soft start circuit 16 via a line 36.

A housing 25 supports electrode 14 and tip 24. The housing 25 preferably allows for electrical contact between electrode 14 and tip 24 during the contact start process. It should be understood that the electrical contact between electrode 14 and tip 24 may be accomplished by a number of ways.

In the embodiment illustrated in FIG. 1, tip 24 is connected to a positive ground 37 via a small resistance 38, sometimes referred to as a pilot resistor. The workpiece 26 is preferably connected directly to the positive ground 37. Therefore, as is known in the art, the presence of the resistor 38 allows an arc established between electrode 14 and tip 24 to transfer to workpiece 26 when electrode 14 is placed in proximity to workpiece 26.

In operation, upon power-up and satisfaction of various safety interlocks (not including the parts-in-place safety reset check herein described), power supply 12 provides DC output voltage $V_{out}$ under control of soft start circuit 16. Soft start circuit 16 serves to limit the application of power according to a soft start characteristic. Those skilled in the art will recognize that there are many ways to implement a soft start circuit 16 having a desirable soft start characteristic. One approach is to add a capacitance between the power line and a ground line (e.g., reference character 39, shown in phantom, tied to ground 37). The charging process of the capacitance causes the power output to momentarily shunt to ground upon initial power application. Thereafter, the power output ramps up according to a capacitive charging characteristic until the capacitive element reaches full charge. When the capacitive element fully charges, it acts as an open circuit, thereby enabling the application of the full output power $V_{out}$ to electrode 14. Power processing circuit 18 controls the power applied on power line 20 to electrode 14 via techniques that are known in the art. In one form, power processing circuit includes a modulating circuit and pulse width modulates the power provided to electrode 14. Although not illustrated in FIG. 1, a separate control, responsive to a torch trigger, enables power supply 12. Thus, soft start circuit 16 conditions the power output of power supply 12, and a power signal that transitions from an initial level to an operating level is provided to electrode 14.

In torches such as the contact start torch system 10 shown in FIG. 1, electrode 14 and tip 24 make electrical contact when striking a pilot arc. If electrode 14 and/or tip 24 are not correctly in place, it may not be possible to properly or safely generate a pilot arc. Monitor circuit 22 monitors the voltage $V_{electrode}$ between electrode 14 and tip 24, and the current $I_{electrode}$ flowing through power line 20 and electrode 14. Monitor circuit 22 uses the monitored values of $V_{electrode}$ and $I_{electrode}$ to determine whether electrode 14 and tip 24 have made sufficient electrical contact and are properly in place. More particularly, in order to initiate a pilot arc, it is necessary to bring electrode 14 and tip 24 into electrical contact, typically by moving electrode 14 and/or tip 24 relative to each other. If, during this time, the magnitude of $V_{electrode}$ exceeds a preselected voltage value (e.g., 40 V) thereby indicating an open circuit, monitor circuit 22 modifies the value of status signal 28 to indicate the detection of the open circuit between electrode 14 and tip 24. Similarly, if during the contact start period the magnitude of electrode current $I_{electrode}$ is less than a preselected current value (e.g., 5 A) thereby indicating an open circuit, monitor circuit 22 modifies the value of status signal 28 to indicate the detection of the open circuit between electrode 14 and tip 24 when a closed circuit condition was expected.

In the embodiment shown in FIG. 1, monitor circuit 22 also optionally monitors work current $I_{work}$ via a line 40. Line 40 is shown in phantom because the safety reset function may be accomplished without monitoring work current $I_{work}$. If the magnitude of work current $I_{work}$ exceeds a preselected value (e.g., 4 A) thereby indicating excessive, unexpected current flow from electrode 14 to workpiece 26, monitor circuit 22 modifies the value of status signal 28 to indicate that excessive, unexpected current is flowing in workpiece 26. As explained below with respect to FIG. 2, monitoring work current $I_{work}$ accounts for the situation in which tip 24 is missing but electrode 14 is in contact with workpiece 26 during the contact start period. In such a situation, simply monitoring electrode voltage $V_{electrode}$ and electrode current $I_{electrode}$ can erroneously indicate that the parts are in place. This "false positive" occurs because $V_{electrode}$ is relatively low and $I_{electrode}$ is relatively high if electrode 14 contacts workpiece 26 during the contact start process, thereby erroneously indicating that electrode 14 and tip 24 are in place. Thus, by monitoring work current $I_{work}$, monitor circuit 22 is informed of the presence of current in workpiece 26 when no such current is expected.

Advantageously, monitoring work current $I_{work}$ also affords protection when the torch head comes into contact with workpiece 26 with sufficient force to cause tip 24 to compress into contact with electrode 14. Such a situation is possible, for example, with a contact start torch in which tip 24 moves relative to electrode 14. Thus, when torch monitor circuit 22 detects unexpected continuity between electrode 14 and workpiece 26 during normal operation of the torch, soft start circuit 16 may also be reset to prevent the application of a relatively high power output directly to workpiece 26. As such, damage to workpiece 26 and/or torch system 10 may be avoided or reduced.

Preferably, status signal 28 is a function of up to three separate signals, the first being indicative of electrode current $I_{electrode}$, the second being indicative of $V_{electrode}$, and the third being indicative of work current $I_{work}$. Thus, as explained more fully below, the combination of these three status signals may be monitored by reset circuit 30 to determine whether to apply reset signal 34 to soft start circuit 16.

In summary and referring still to FIG. 1, torch system 10 includes electrode 14 and tip 24. Tip 24 has an electrical relationship with electrode 14. It should be noted that the electrical relationship between electrode 14 and tip 24 has a selective aspect in that there may be a specific electrical relationship during the contact start process in the nature of a short circuit. After the contact start process and before arc transfer, there may exist an electrical relationship between electrode 14 and tip 24 in the nature of a pilot arc. Housing 25 supports electrode 14 and tip 24 in a manner that allows the selective establishment of electrical continuity between electrode 14 and tip 24 when so desired. Power supply 12 supplies power output $V_{out}$. Soft start circuit 16 controls power supply 12 and conditions power output $V_{out}$. By controlling power supply 12, soft start circuit 16, provides power signal 41 to electrode 14. Power signal 41 transitions from an initial level to an operating level. Monitor circuit 22 monitors the electrical relationship between electrode 14 and tip 24. Monitor circuit 22 provides status signal 28 to reset circuit 30. Status signal 28 is indicative of the electrical relationship between electrode 14 and tip 24. Reset circuit 30 is responsive to status signal 28. Reset circuit 30 resets soft start circuit 16 when status signal 28 indicates an unacceptable electrical relationship between electrode 14 and tip 24. When soft start circuit 16 receives reset signal 34, soft start circuit 16 is reset such that power signal 41 returns to the initial level.

It should be understood that although soft start circuit 16 is illustrated in FIG. 1 as conditioning power output $V_{out}$, the invention is intended to work with other soft start configurations and/or other circuitry having soft start characteristics. For example, soft start circuit 16 may be integral with power supply 12 or a separate power supply controller. Further, although soft start circuit has also been illustrated and discussed with respect to a capacitance (e.g., ref. char. 39 shown in phantom in FIG. 1), a series inductance could also be used. In other words, an inductive element in series with the power supply would also limit the application of power to electrode 14 as a function of time.

Figure 2:
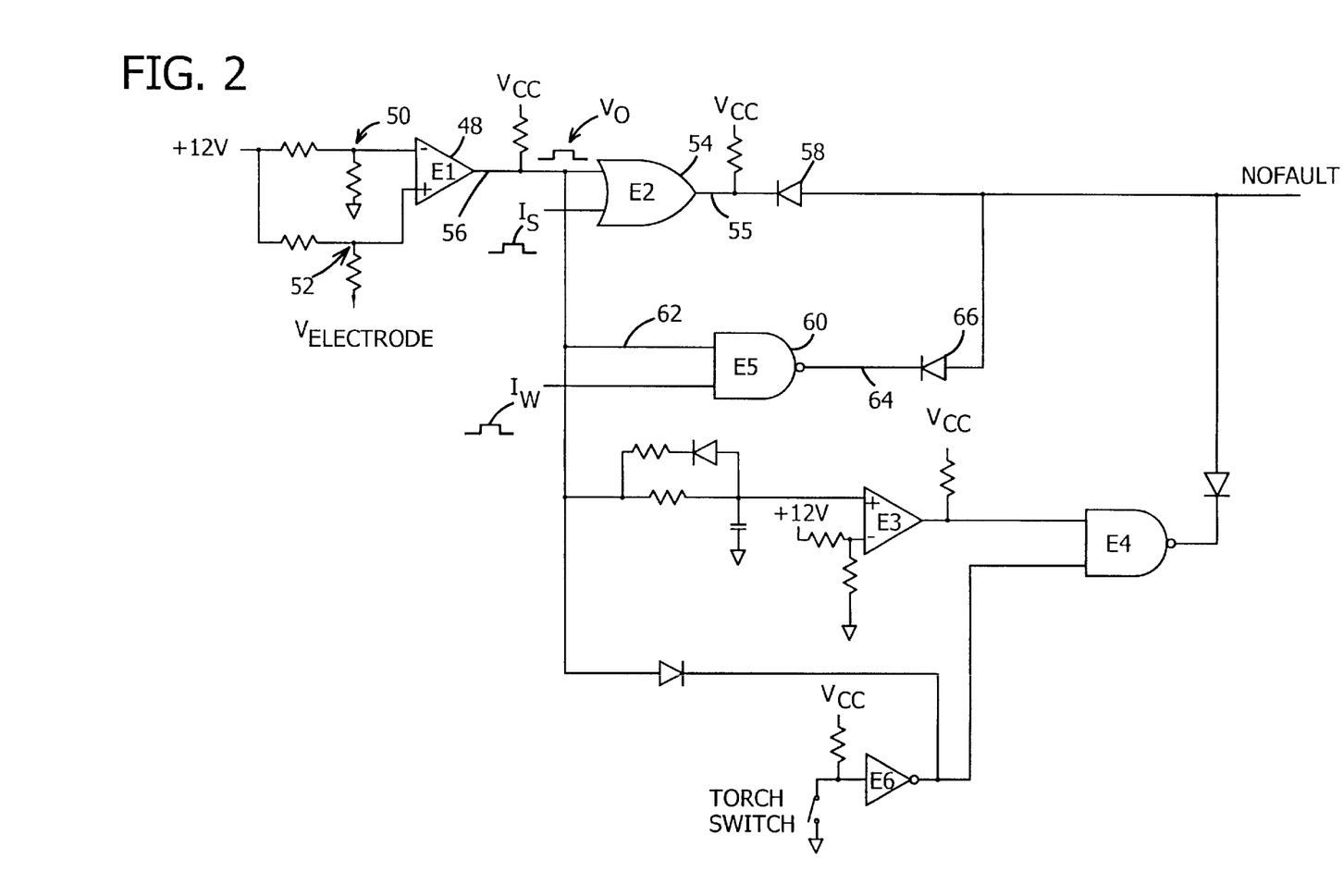
FIG. 2 is a schematic diagram illustrative of embodiments of monitor and reset circuits suitable for use with the torch shown in FIG. 1.

FIG. 2 is a schematic diagram of a parts-in-place safety reset circuit suitable for use with the present invention. As illustrated therein, electrode voltage $V_{electrode}$ is supplied to one input of a comparator 48 via a voltage divider network 52. The other input of the comparator 48 is connected to a reference voltage derived from a 12 volt DC source connected to another voltage divider network 50. The output of comparator 48 comprises an electrode voltage status signal $V_O$. More specifically, the electrode voltage status signal $V_O$ is a digital signal that is indicative of whether electrode voltage $V_{electrode}$ is greater than or less than a voltage threshold. The voltage threshold may be set by selecting the values used in the voltage divider networks 50, 52.

Electrode voltage status signal $V_O$ is connected to a first input of a dual input OR gate 54 via line 56. The second input of the OR gate 54 is connected to an electrode current status signal $I_S$. Current signal $I_S$ is indicative of electrode current $I_{electrode}$ (FIG. 1). It should be understood that electrode current status signal $I_S$ may be generated a number of ways, such as, for example, converting electrode current $I_{electrode}$ to a voltage and comparing that voltage to a preset threshold value, whereby current status signal $I_S$ is the result of the comparison. Preferably, current status signal $I_S$ comprises a digital signal that indicates whether electrode current $I_{electrode}$ is greater than or less than a threshold value. The output 55 of OR gate 54, in turn, is connected to a NOFAULT signal via a diode 58.

The electrode voltage status signal $V_O$ is also connected to a first input of a dual input NAND gate 60 via a line 62. The second input of the NAND gate 60 is connected to a work current status signal $I_W$ indicative of work current $I_{work}$ (FIG. 1). Like electrode current status signal $I_S$, work current status signal $I_W$ may be generated a number of ways. Preferably, work current status signal $I_W$ is a digital signal indicating whether work current $I_{work}$ is greater or less than a threshold value. The output 64 of NAND gate 60 is connected to the NOFAULT signal via a diode 66.

In the embodiment shown in FIG. 2, voltage status signal $V_O$, electrode current status signal $I_S$, and work current status signal $I_W$ reflect digital signals having values determined by equations 1–3 below. It is to be understood, however, that the particular threshold values illustrated in equations 1–3 may be varied to accommodate particular needs. Thus, the values shown in equations 1–3 are for illustrative purposes only, and should not be used to construe FIG. 2 or the invention in a limiting sense.

$$V_O = \text{Logic Low}(L) \text{ if magnitude of electrode voltage } V_{electrode} > 40\,\text{V} \quad [1]$$
$$\text{Logic High}(H) \text{ if magnitude of electrode voltage } V_{electrode} < 40\,\text{V}$$

$$I_s = \text{Logic Low}(L) \text{ if magnitude of electrode current } I_{electrode} < 5\,\text{A} \quad [2]$$
$$\text{Logic}(H) \text{ if magnitude of electrode current } I_{electrode} > 5\,\text{A}$$

$$I_W = \text{Logic Low}(L) \text{ if magnitude of work current } I_{work} < 4\,\text{A} \quad [3]$$
$$\text{Logic High}(H) \text{ if magnitude of work current } I_{work} > 4\,\text{A}$$

Referring to FIGS. 1 and 2 together and to TABLE I below, in operation, if both voltage status signal $V_O$ and electrode current status signal $I_S$ are low, output 55 of OR gate 54 is low. A low on output 55 pulls NOFAULT low. A low on output 55 indicates that electrode 14 and/or tip 24 are not in place (e.g., state 1). As explained above, upon application of power to the electrode (i.e., during the contact start process), the magnitude of electrode voltage $V_{electrode}$ typically ramps up from an initial value at or near zero volts to an operating value due to the operation of soft start circuit 16 and power processing circuit 18. As shown in equation 1, voltage status signal $V_O$ is a logic low when the magnitude of electrode voltage $V_{electrode}$ is greater than 40 V. If electrode 14 and tip 24 are properly in place, there should be a short circuit therebetween during the contact start process. Thus, the magnitude of $V_{electrode}$ should be less than 40 V during the contact start process (e.g., state 3). On the other hand, once the contact start process has successfully completed and electrode 14 and tip 24 are no longer shorted together, the magnitude of electrode voltage $V_{electrode}$ should normally exceed 40 V (e.g., states 2 & 5).

Preferably, the present invention also monitors electrode current $I_{electrode}$ in determining whether electrode 14 and/or tip 24 are properly in place. As shown in equation 2, when the magnitude of electrode current $I_{electrode}$ is less than 5 A, electrode current status signal $I_S$ is a logic low. If electrode 14 and tip 24 are properly in place, there should be a short therebetween during the contact start process. Thus, the magnitude of electrode current $I_{electrode}$ should be relatively high (e.g., greater than 5 A) when a short circuit exists between electrode 14 and tip 24 during the contact start process (e.g., states 2 & 5).

A low on output 55 of OR gate 54 pulls NOFAULT low through diode 58. Similarly, a low on output 64 of NAND gate 60 pulls NOFAULT low through diode 66. NOFAULT is a logic signal indicative of a status of electrode 14 and tip 24. A logic high on NOFAULT indicates that electrode 14 and tip 24 are installed (e.g., states 2, 3, & 5). Conversely, a logic low on NOFAULT indicates that electrode 14 and tip 24 are not properly in place (e.g., states 1 & 6).

The NOFAULT signal is the functional equivalent of reset signal 34 in FIG. 1. Accordingly, when NOFAULT is low, soft start circuit 16 is reset, thereby inhibiting the full application of output voltage $V_{out}$ to electrode 14. As can be seen from equation 1, therefore, by selecting a threshold value of 40 volts, the parts-in-place safety reset circuit depicted in FIGS. 1 and 2 resets soft start circuit 16 in a manner that prevents the application of voltages greater than 40 volts when electrode 14 and/or tip 24 are not properly in place. In other words, if electrode 14 and/or tip 24 are not properly in place, the output voltage applied to electrode 14 is reset when it reaches approximately 40 volts. It should be understood that any of a number of voltage threshold values may be selected to suit particular needs and/or circuit characteristics.

Advantageously, by also monitoring work current $I_{work}$ via status signal $I_W$, the safety reset circuit shown in FIG. 2 accounts for the situation in which torch tip 24 is removed or missing and electrode 14 contacts the grounded workpiece 26 (see FIG. 1). In such a situation, voltage status signal $V_O$ would be a logic high—indicating that the magnitude of electrode voltage $V_{electrode}$ is less than 40 V. Output 55 of OR gate 54 would be high, thereby allowing NOFAULT to remain high and the torch enabled in an undesirable condition. To avoid this situation, the safety reset circuit monitors work current status signal $I_W$, which as explained above, is representative of the magnitude of work current $I_{work}$ as compared to a threshold. During normal torch startup, there should be very little current flowing through workpiece 26 because the arc should not typically be transferred until after startup is complete. Therefore, work current status signal $I_W$ is a logic high if work current $I_{work}$ exceeds a threshold value (e.g., 4 A), and low if $I_{work}$ is less than the threshold value. NAND gate 60 monitors work current status signal $I_W$ and voltage status signal $V_O$. The output 64 of NAND gate 60 is connected to the NOFAULT signal through diode 66. As can be seen, if $V_O$ is high and $I_W$ is high—indicating that the comparator senses that the electrode and tip are in place but the existence of work current indicates otherwise—the output of NAND gate 60 goes low and pulls NOFAULT low through diode 66 (e.g., state 6). Thus, the safety reset circuit shown in FIG. 2 also resets the soft start circuit 16 in a manner that prevents the application of voltages greater than 40 volts when the circuit senses the presence of work current when such current is not expected.

As explained above, monitoring $I_{work}$ also accommodates the possibility of the torch head coming into contact with workpiece 26 with sufficient force to cause tip 24 to compress into electrode 14, thereby placing electrode 14 in direct electrical contact with workpiece 26.

If electrode 14 and tip are properly in place during the contact start process but for some reason fail to separate, the magnitude of $V_{electrode}$ will be less than 40 V and the magnitude of $I_{electrode}$ will remain above 5 amps, thus indicating a short circuit condition when such condition is not expected (e.g., state 4). In that case, circuitry other than the safety reset circuit herein described shuts down the power supply after a time delay that accounts for the contact start process.

TABLE 1 is a logic truth table that describes the status of the NOFAULT signal based on the states of $I_W$, $V_O$, and $I_S$. As used in TABLE 1, "H" indicates a logic high, "L" indicates a logic low, and "X" indicates a do not care.

TABLE I

| State | $I_W$ | $V_O$ | $I_S$ | NO-FAULT | Description |
|---|---|---|---|---|---|
| 1 | X | L | L | L | Tip and/or electrode not in place; safety reset circuit resets process when output voltage reaches −40V (power ramps between 0V and −40V) |
| 2 | L | L | H | H | Normal arc condition; voltage ramps up beyond −40V to its final value (e.g., −120V) |
| 3 | L | H | L | H | Normal turn on operation |
| 4 | L | H | H | H | Improper turn on; tip and electrode fail to separate; circuitry other than safety reset circuit shuts down power supply after a time delay |
| 5 | H | L | H | H | Normal arc condition; voltage ramps up beyond −40V to its final value (e.g., −120V); current flowing through work |
| 6 | H | H | X | L | Work current sensed when no work current expected; safety reset circuit resets process when output voltage reaches −40V (power ramps between 0V and −40V) |

As can now be appreciated, the device disclosed in FIGS. 1 and 2 can also be used to detect insufficient contact between electrode 14 and tip 24 during the contact start process. For example, debris, corrosion, or wear may prevent electrode 14 and tip 24 from establishing sufficient continuity to allow a successful contact start.

Although FIGS. 1 and 2 have been described with reference to a grounded (e.g., conductive) workpiece 26, the invention should not be construed as limited to applications having a grounded workpiece. The detection capability herein described can also be used to detect the presence or absence of electrode 14 and/or tip 24 with torches operating in a non-transferred arc mode. By way of example, such a non-transferred arc operating mode could be used to cut plexiglass or another non-conductive workpiece.

Figure 3:
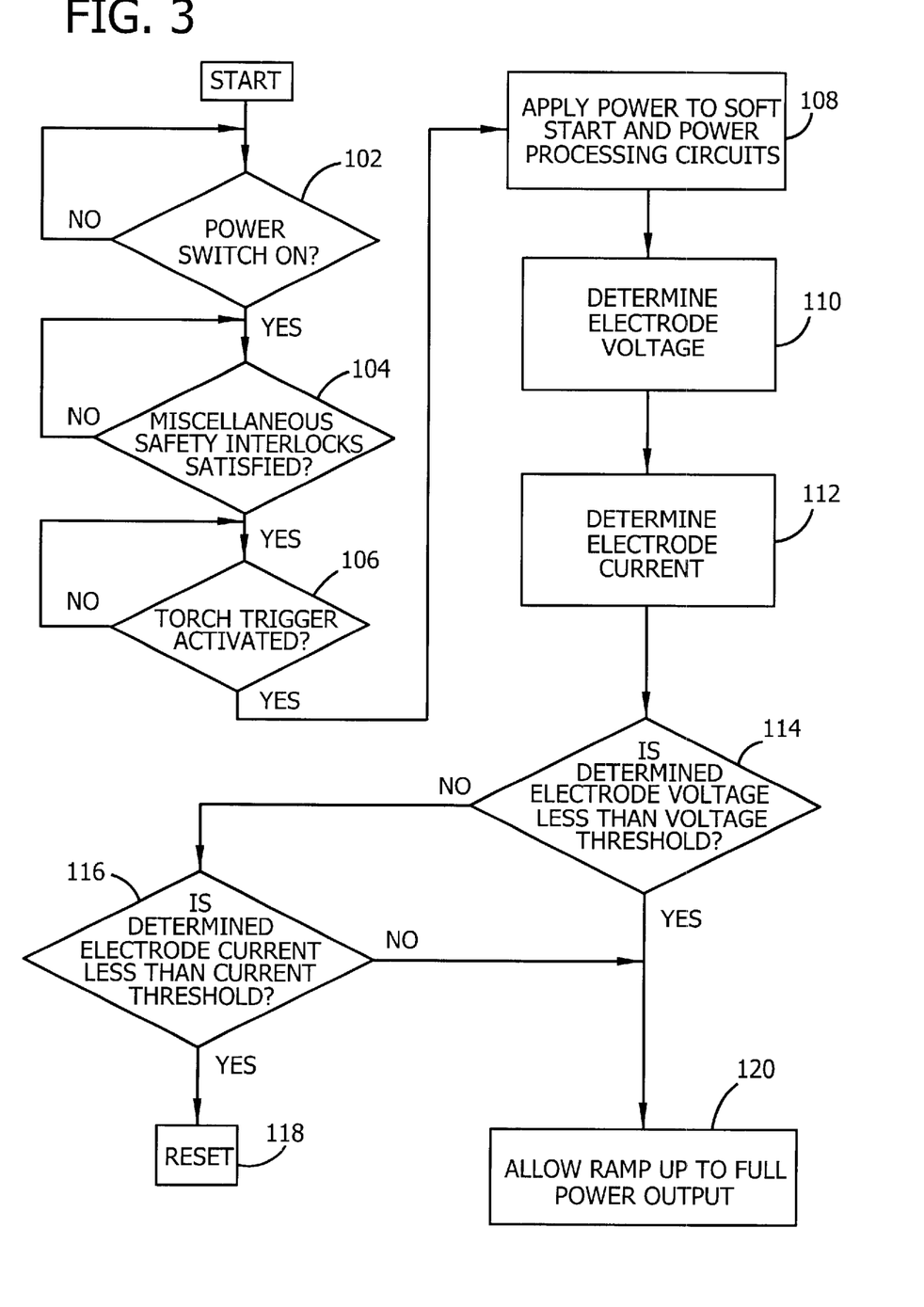
FIG. 3 is flow chart of one embodiment of a method of operating a contact start torch to ensure that tip and/or electrode are properly in place.
Figure 4:
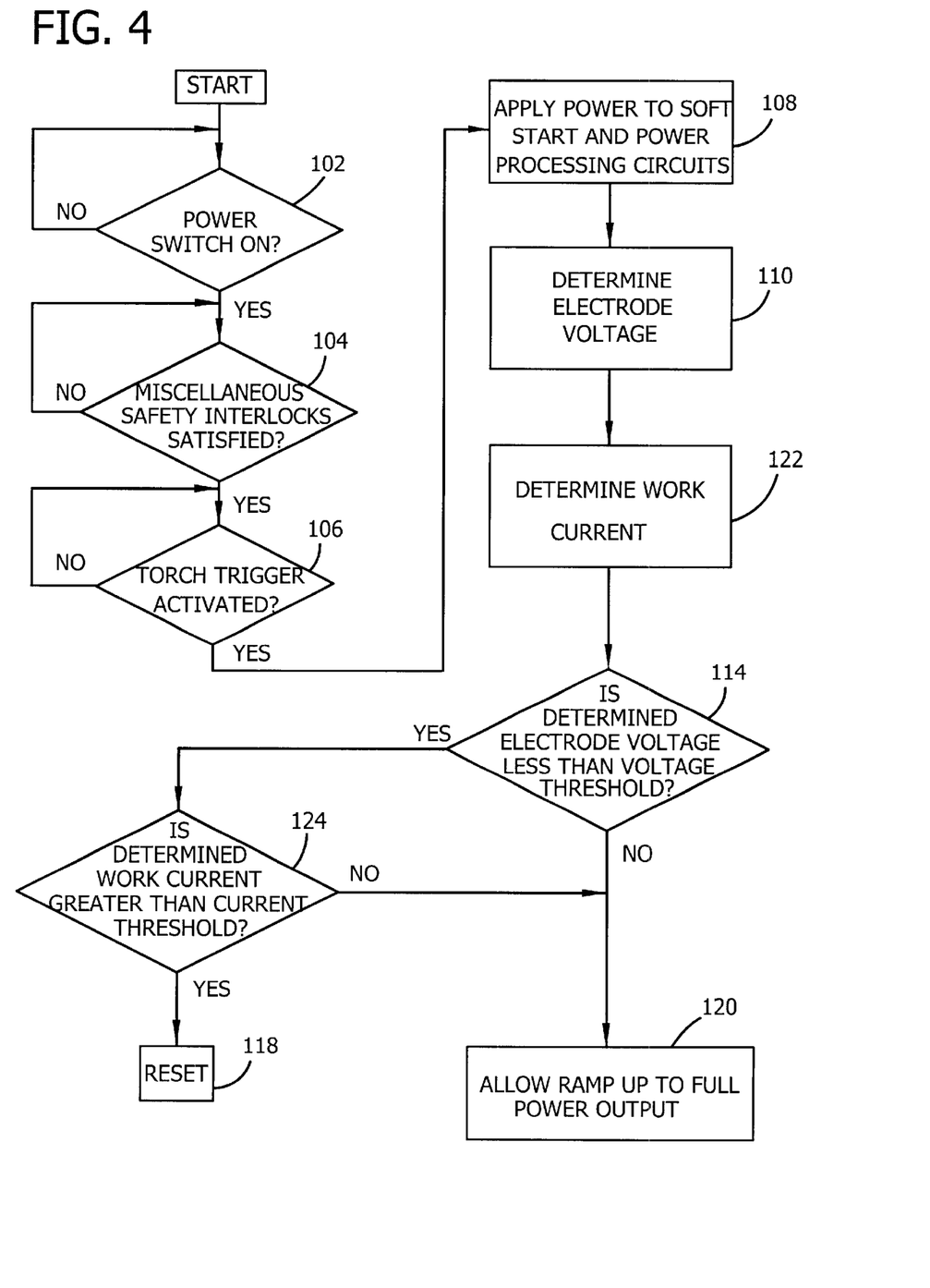
FIG. 4 is a flow chart of one embodiment of a method of operating a contact start torch to ensure that the torch electrode has not come into improper electrical contact with a workpiece.
Figure 5:
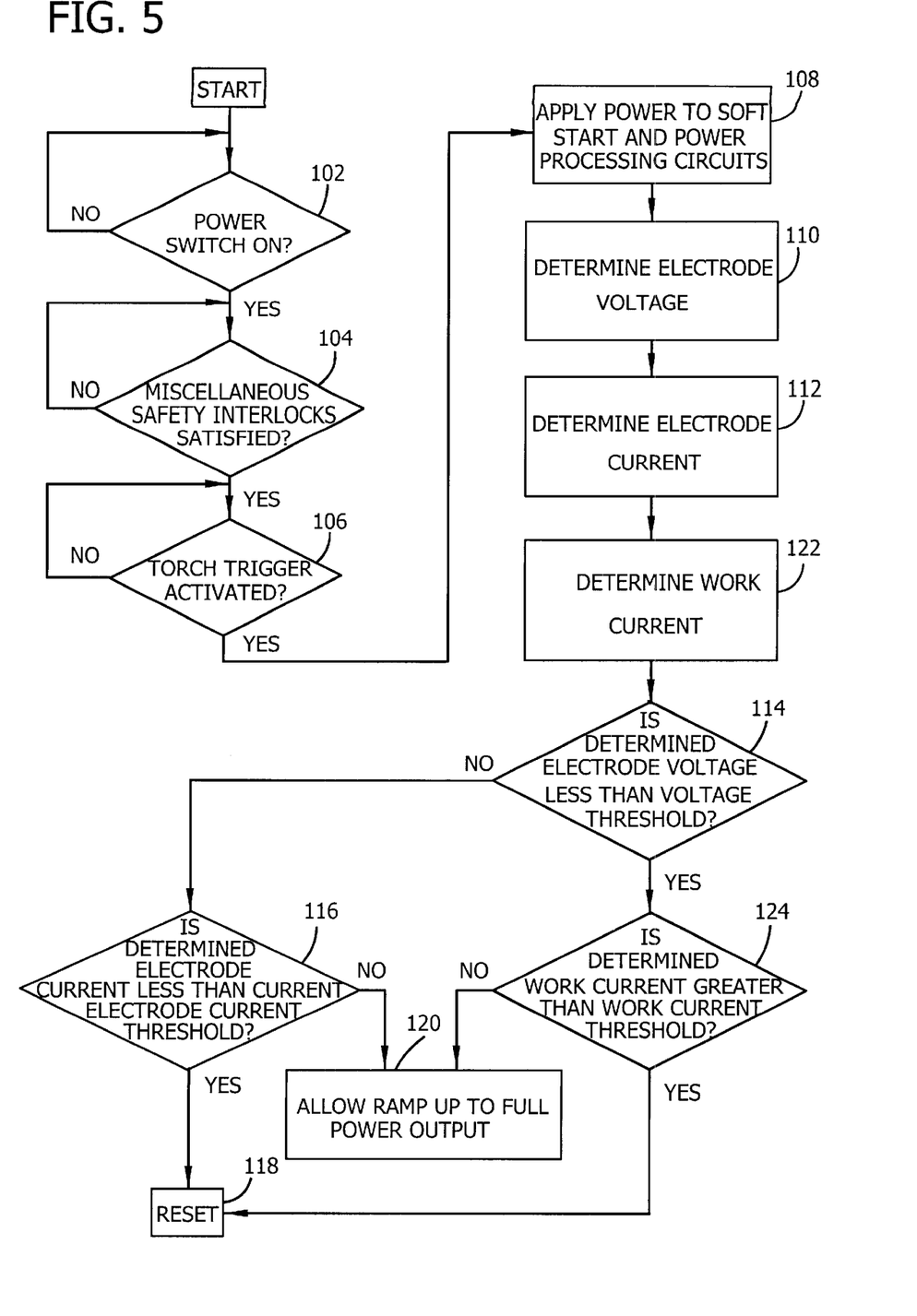
FIG. 5 is a flow chart combining the methods illustrated in FIGS. 3 and 4.

FIGS. 3–5 are flow charts illustrating several methods for ensuring the proper installation of the tip and electrode in a contact start torch before applying full power to the electrode. It should be appreciated that the sequences of steps shown in FIGS. 3–5 are for illustrative purposes only. The steps may be conducted in different orders, in parallel, and/or in connection with additional steps without detracting from or limiting the present invention or FIGS. 3–5. Further, the specific steps may be employed with the circuitry disclosed and described with respect to FIGS. 1 and 2, or may be employed with different circuitry, including, for example, microprocessors or microcontrollers.

FIG. 3 illustrates a method in which electrode voltage and electrode current are monitored to ensure that the torch tip and electrode are properly installed. A series of initial start-up checks is conducted at steps 102, 104, and 106. In particular, before applying power to the torch head, the main power switch of the power supply must be in the "on" position, miscellaneous safety interlocks (unrelated to the parts-in-place safety reset tests described herein) must be satisfied, and the torch trigger must be activated. If the initial start-up conditions are satisfied, power supply 12 applies power to soft start circuit 16 and power processing circuit 18 at step 108. At steps 110–116, electrode voltage $V_{electrode}$ and electrode current $I_{electrode}$ are measured and compared to respective voltage and current threshold values. Preferably, these measurements and comparisons occur at all times that power is applied to the unit. Representative values for the voltage and current comparisons are provided above in equations 1 and 2. If it is determined at steps 114 and 116 that: (a) the electrode voltage is greater than the voltage threshold, and (b) the electrode current is less than the current threshold (indicating an open circuit and that the tip and electrode are not in contact as expected), the soft start circuit is reset at step 118. Thus, if the tip and/or electrode are not installed, power is not allowed to fully ramp up because the soft start circuit is reset. Otherwise, the soft start process is uninterrupted and power is allowed to ramp up to the full output at step 120. If the operator continues to activate the torch trigger despite the fact that a reset has occurred, the process repeats, resulting in a "saw tooth" like power waveform due to the repetitive soft start process.

FIG. 4 illustrates a method in which electrode voltage and work current are monitored to ensure that the torch tip and electrode are properly installed. The method depicted in FIG. 4 generally follows that of FIG. 3 except that work current is monitored rather than electrode current. At step 108, power supply 12 supplies power to soft start circuit 16 and power processing circuit 18, after completing start up checks at steps 102–106. At steps 110, 114, 122, and 124, electrode voltage $V_{electrode}$ and work current $I_{work}$ are measured and compared to respective voltage and current threshold values. Representative values for the voltage and current comparisons are provided above in equations 1 and 3. If it is determined at steps 114 and 124 that the electrode voltage is less than the voltage threshold and work current is greater than a work current threshold, the soft start circuit is reset at step 118. Thus, if the tip and/or electrode are not installed, power is not allowed to ramp up because the soft start circuit is reset. Otherwise, the soft start process is uninterrupted and power is allowed to ramp up to the full output at step 120. In a manner similar to that associated with FIG. 3, if the operator continued to activate the torch trigger despite the fact that a reset occurred, the process would repeat, resulting in a "saw tooth" like power waveform due to the repetitive soft start process.

FIG. 5 illustrates the combination of methods shown in FIGS. 3 and 4. In particular, FIG. 5 illustrates a method in which electrode voltage, electrode current, and work current are all monitored to ensure proper torch tip and electrode installation.

It should be understood that although FIGS. 1–5 illustrate a safety reset circuit for use with a contact torch having a single power supply, the parts-in-place safety reset circuit and method of the present invention may be used with torch systems using multiple power supplies or power supplies having multiple outputs. For example, the safety reset circuit and method of the present invention may be adapted to work with a torch system in which the pilot arc is established with a separate power supply other than the power supply used for maintaining the pilot arc or the transferred arc. Further, the safety reset circuit and method of the present invention may be adapted to work with parts-in-place detection circuits that apply a low voltage signal to the electrode to perform a continuity test before or during the contact start process.

In view of the above, it will be seen that the several objects of the invention are achieved and other advantageous results attained.

As various changes could be made in the above constructions and methods without departing from the scope of the invention, it is intended that all matter contained in the above description or shown in the accompanying drawings shall be interpreted as illustrative and not in a limiting sense.

What is claimed is:

1. A plasma arc torch for use in connection with a workpiece, said torch comprising:

an electrode;

a tip having an electrical relationship with the electrode;

a power supply having a power output;

a housing supporting the tip and the electrode, said housing allowing electrical continuity between the tip and the electrode;

a soft start circuit in electrical combination with the power supply, the combination of said soft start circuit and said power supply providing a power signal to the electrode that transitions from an initial level to an operating level;

a monitor circuit monitoring the electrical relationship between the tip and the electrode, said monitor circuit providing a status signal indicative of the electrical relationship between the tip and the electrode; and a reset circuit responsive to the status signal wherein said reset circuit resets the soft start circuit so that the power signal returns to the initial level when the status signal indicates an unacceptable electrical relationship between the tip and the electrode.

2. The plasma arc torch of claim 1 wherein:

the monitor circuit monitors a voltage associated with the electrode and compares the monitored voltage to a voltage threshold; and the status signal indicates whether the monitored voltage is greater than or less than the voltage threshold.

3. The plasma arc torch of claim 2 wherein:

the monitor circuit monitors a current associated with the electrode and compares the monitored current to a current threshold;

the status signal indicates whether the monitored current is greater than or less than the current threshold; and the reset circuit resets the soft start circuit when the status signal indicates that the monitored voltage is greater than the voltage threshold and that the monitored current is less than the current threshold.

4. The plasma arc torch of claim 2 wherein:

the monitor circuit monitors a current associated with the workpiece and compares the monitored current to a current threshold;

the status signal indicates whether the monitored current is greater than or less than the current threshold; and the reset circuit resets the soft start circuit when the status signal indicates that the monitored voltage is less than the voltage threshold and that the monitored current is greater than the current threshold.

5. The plasma arc torch of claim 2 wherein:

the monitor circuit monitors an electrode current associated with the electrode and compares the monitored electrode current to an electrode current threshold;

the monitor circuit monitors a work current associated with the workpiece and compares the monitored work current to a work current threshold;

the status signal indicates whether the monitored electrode current is greater than or less than the electrode current threshold;

the status signal indicates whether the monitored work current is greater than or less than the work current threshold; and the reset circuit resets the soft start circuit if the status signal indicates that the monitored voltage is greater than the voltage threshold and that the monitored electrode current is less than the electrode current threshold, the reset circuit also resetting the soft start circuit if the status signal indicates that the monitored voltage is less than the voltage threshold and that the monitored work current is greater than the work current threshold.

6. The plasma arc torch of claim 1 wherein the soft start circuit comprises a capacitive circuit element having a capacitive charging characteristic.

7. The plasma arc torch of claim 1 wherein the initial level is less than the operating level.

8. The plasma arc torch of claim 7 wherein the transition from the initial level to the operating level substantially follows a capacitive charging characteristic.

9. The plasma arc torch of claim 1 further comprising a modulating circuit, said modulating circuit controlling the power signal provided to the electrode by pulse width modulation.

10. A plasma arc torch for use in connection with a workpiece, said torch comprising:

an electrode;

a tip having an electrical relationship with the electrode;

a power supply having a power output;

a housing supporting the tip and the electrode, said housing allowing electrical continuity between the tip and the electrode;

a soft start circuit in electrical communication with the power supply, said soft start circuit supplying a power signal to the electrode via a soft start process, said soft start process transitioning the power signal from an initial level to an operating level;

a monitor circuit monitoring the electrical relationship between the tip and the electrode, said monitor circuit providing a status signal indicative of the electrical relationship between the tip and the electrode; and a reset circuit responsive to the status signal wherein said reset circuit resets the soft start circuit so that the power signal returns to the initial level when the status signal indicates an unacceptable electrical relationship between the tip and the electrode.

11. The plasma arc torch of claim 10 wherein:

the monitor circuit monitors a voltage associated with the electrode and compares the monitored voltage to a voltage threshold; and the status signal indicates whether the monitored voltage is greater than or less than the voltage threshold.

12. The plasma arc torch of claim 11 wherein:

the monitor circuit monitors a current associated with the electrode and compares the monitored current to a current threshold;

the status signal indicates whether the monitored current is greater than or less than the current threshold; and the reset circuit resets the soft start circuit when the status signal indicates that the monitored voltage is greater than the voltage threshold and that the monitored current is less than the current threshold.

13. The plasma arc torch of claim 11 wherein:

the monitor circuit monitors a current associated with the workpiece and compares the monitored current to a current threshold;

the status signal indicates whether the monitored current is greater than or less than the current threshold; and the reset circuit resets the soft start circuit when the status signal indicates that the monitored voltage is less than the voltage threshold and that the monitored current is greater than the current threshold.

14. The plasma arc torch of claim 11 wherein:

the monitor circuit monitors an electrode current associated with the electrode and compares the monitored electrode current to an electrode current threshold;

the monitor circuit monitors a work current associated with the workpiece and compares the monitored work current to a work current threshold;

the status signal indicates whether the monitored electrode current is greater than or less than the electrode current threshold;

the status signal indicates whether the monitored work current is greater than or less than the work current threshold; and the reset circuit resets the soft start circuit if the status signal indicates that the monitored voltage is greater than the voltage threshold and that the monitored electrode current is less than the electrode current threshold, the reset circuit also resetting the soft start circuit if the status signal indicates that the monitored voltage is less than the voltage threshold and that the monitored work current is greater than the work current threshold.

15. A method of operating a contact start plasma arc torch for use in connection with a workpiece, said contact start plasma arc torch including:

an electrode;

a tip having an electrical relationship with the electrode; and a power supply having a power output;

the method comprising:

conditioning via a circuit the power output and providing a power signal to the electrode that transitions from an initial level to an operating level;

monitoring the electrical relationship between the tip and the electrode; and resetting the conditioning circuit so that the power signal returns to the initial level when the monitoring step indicates an unacceptable electrical relationship between the tip and the electrode.

16. The method of claim 15 wherein the monitoring step further comprises:

determining a voltage differential between the electrode and the tip;

comparing the determined voltage differential to a voltage reference value;

determining a parameter associated with a current flowing in a current path associated with the electrode;

comparing the determined current parameter to a current reference value; and resetting the conditioning circuit when the voltage comparing step indicates that the determined voltage exceeds the voltage reference and the current comparing step indicates that the current in the current path associated with the electrode is less than a threshold value whereby the power signal returns to the initial level.

17. The method of claim 15 wherein the monitoring step further comprises:

determining a voltage differential between the electrode and the tip;

comparing the determined voltage differential to a voltage reference value;

determining a parameter associated with a current flowing in a current path associated with the workpiece;

comparing the determined current parameter to a current reference value; and resetting the conditioning circuit when the voltage comparing step indicates that the determined voltage is less than the voltage reference and the current comparing step indicates that the current in the current path associated with the workpiece is greater than a threshold value whereby the power signal returns to the initial level.

18. The method of claim 15 wherein the monitoring step further comprises:

determining a voltage differential between the electrode and the tip and/or the workpiece;

determining a current flowing in a current path associated with the electrode; and resetting the conditioning circuit when the determined voltage differential and the determined current correspond to unacceptable values thereby indicating that the tip and electrode are not in properly place and/or that the electrode and workpiece are in improper contact.

* * * * *